Sept. 16, 1941.  E. A. GLYNN  2,255,770
RETREADING MOLD
Filed March 11, 1940  3 Sheets-Sheet 1
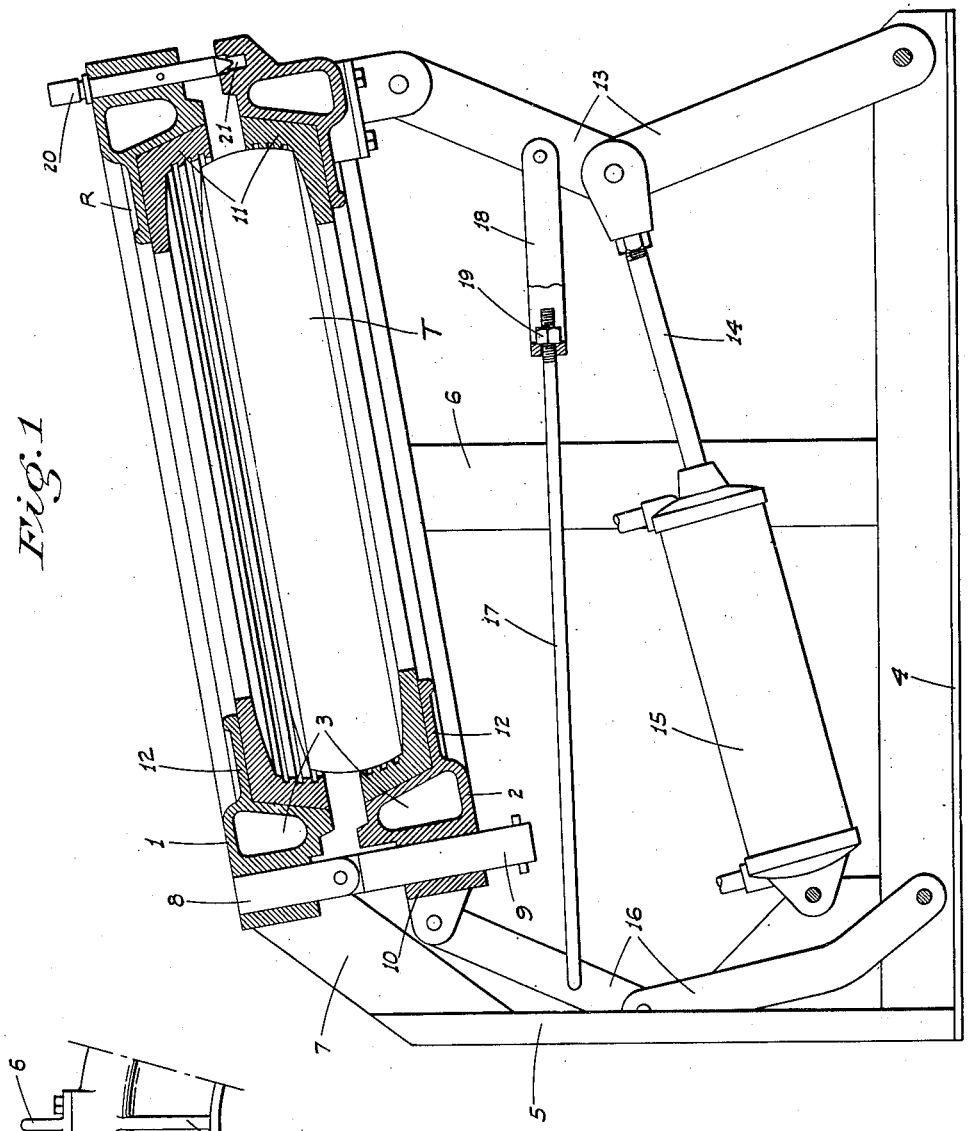
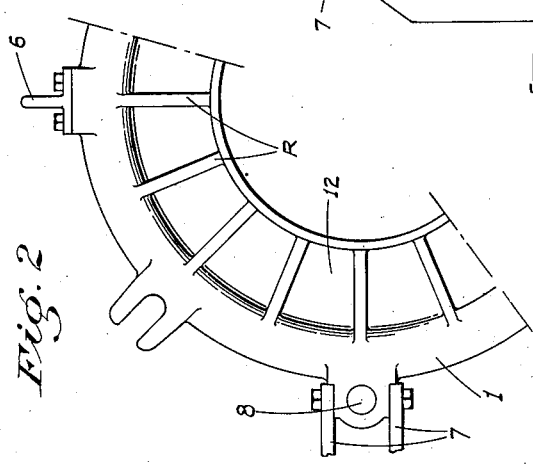
INVENTOR
E. A. Glynn
BY
Webster & Webster
ATTORNEYS

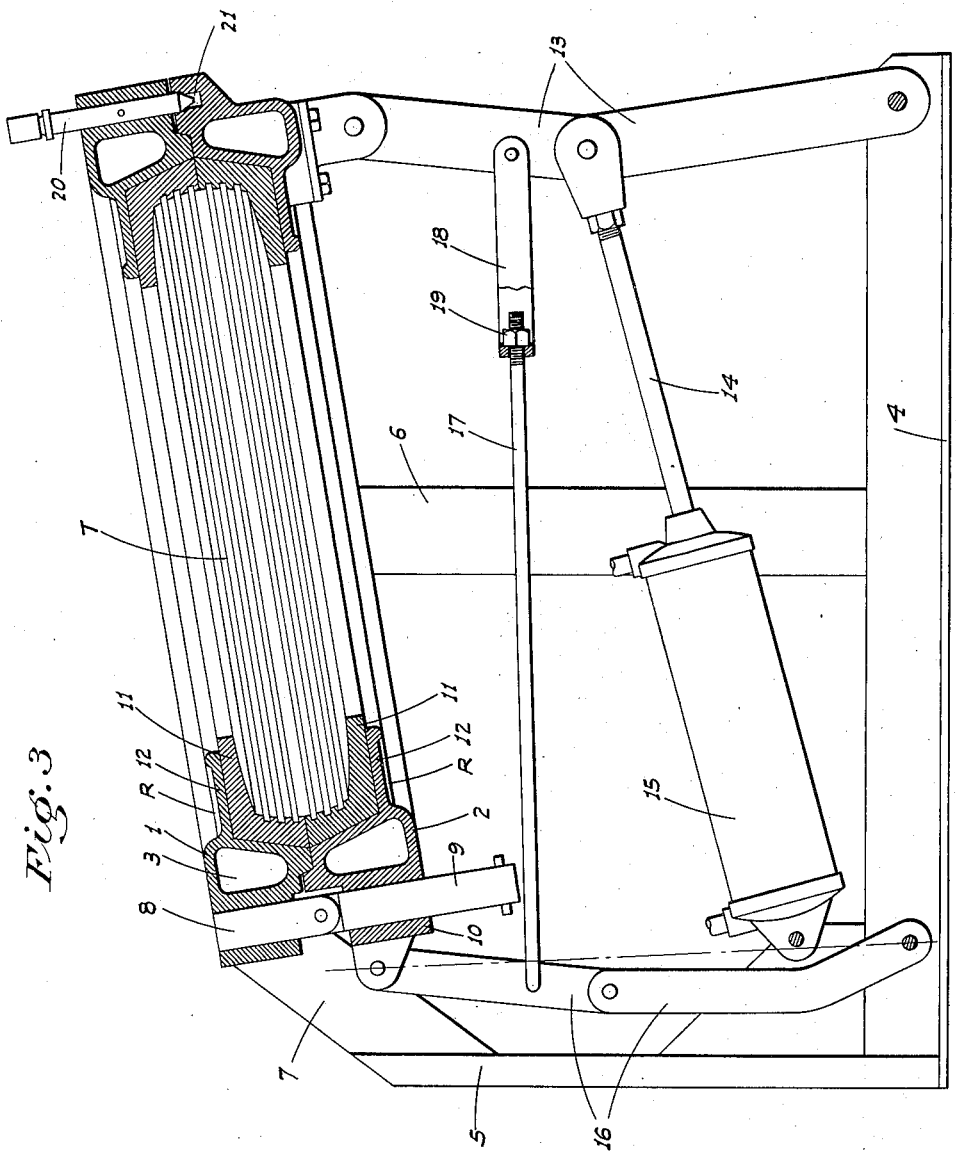

Sept. 16, 1941.　　　　E. A. GLYNN　　　　2,255,770
RETREADING MOLD
Filed March 11, 1940　　　　3 Sheets-Sheet 3

INVENTOR
E. A. Glynn
BY
ATTORNEYS

Patented Sept. 16, 1941

2,255,770

UNITED STATES PATENT OFFICE 2,255,770

RETREADING MOLD

Edwin A. Glynn, Lodi, Calif., assignor to Super Mold Corporation of California, Lodi, Calif.

Application March 11, 1940, Serial No. 323,328

11 Claims. (Cl. 18—18)

This invention relates to a tire retreading mold of the full circle type such as now universally used for retreading purposes, the present mold representing improvements over the well known hinged body-section type of mold, and also over the separated body-section type of mold such as that shown in my Patent No. 2,147,339 dated February 14, 1939.

From long experience with both the above types of mold, I have found that while the angled separating or opening action of the body sections of the hinged type of mold is highly desirable to effect initial loosening of the retreaded tire from the matrix, the corresponding angular closing movement of the body sections tends to pinch the tire or interfere with the proper centralized positioning of the same in mold.

On the other hand, the parallel closing movement of the body sections of the other type of mold avoids the above named objectionable feature of the hinged mold, but the corresponding parallel separating movement of the body sections tends to mutilate the newly formed tread design on the retreaded tire and it has been necessary to resort to a means to initially angle one body section relative to the other, as for instance is shown in my Patent No. 2,184,119 dated December 19, 1939.

It is therefore the principal object of the present invention to provide a mold which combines the advantages of both previous types of mold as above outlined, while avoiding their objectionable features. In other words, the mold sections close with a final parallel movement, and initially open with an angular movement.

A further object is to provide a mold in which placing of a tire into position in the mold is facilitated, without the aid of lifting devices.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a sectional elevation of the mold, showing the position of the mold sections at the inception of their relatively parallel movement during a mold closing operation.

Figure 2 is a fragmentary top plan view of the upper mold section.

Figure 3 is a sectional elevation of the mold showing the mold sections fully closed.

Figure 4:
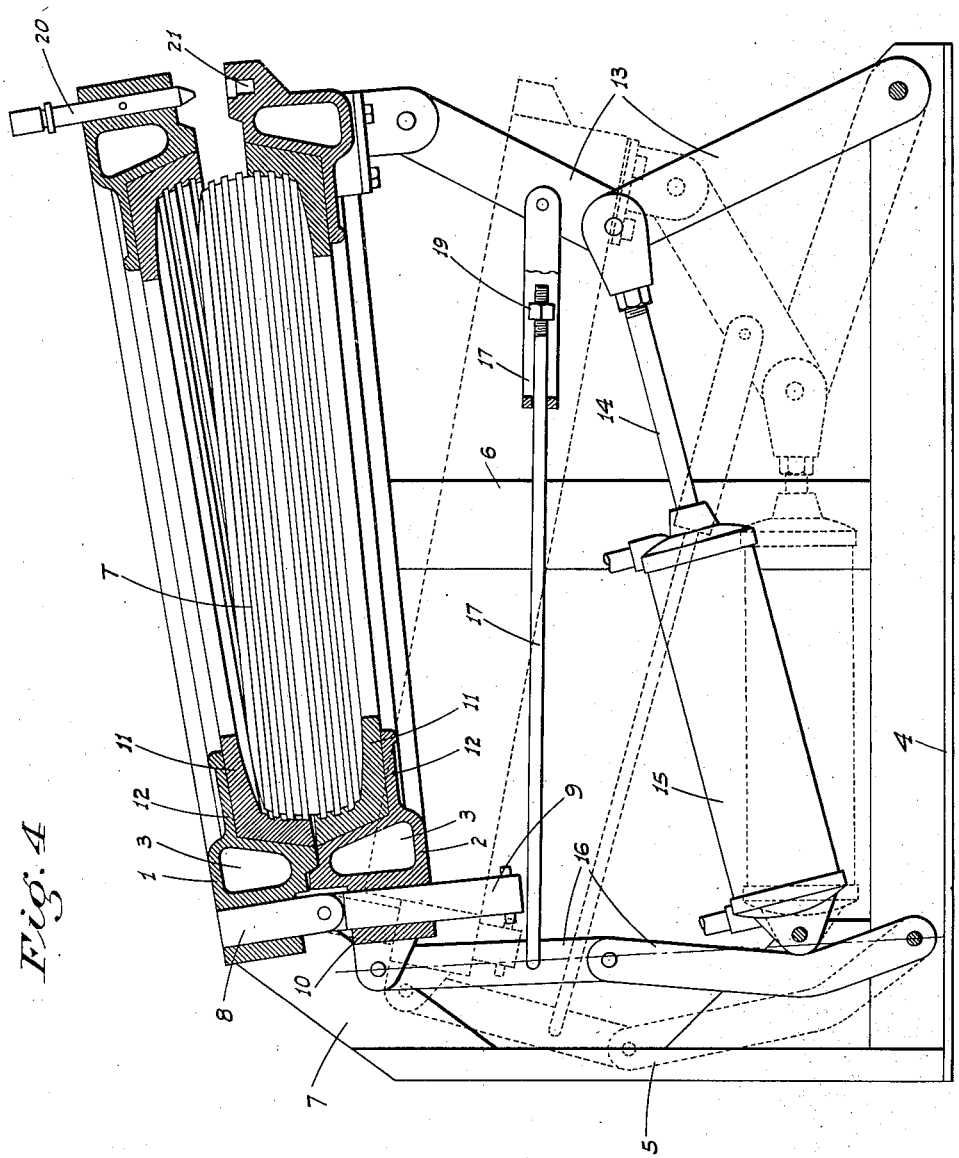
Figure 4 is a similar view showing the initial angling of the mold sections during an opening operation; the fully opened position of the sections being shown in dotted lines.

Referring now more particularly to the characters of reference on the drawings, the mold comprises upper and lower body sections 1 and 2 of endless ring-like form and provided with steam chambers 3, to which the necessary steam circulating pipes (not shown) are connected as usual. The section 1 is stationary and is preferably disposed on a downward slope for better drainage and also to increase working space thereunder at its high side without unduly elevating the mold as a whole. The section 1 is rigidly supported from a base 4 by uprights 5, one upright 5 being at the lowest point of said section and two other uprights 6 being at points substantially 90° from said upright 5, thus leaving the space under the section at its high or front side unobstructed for substantially the diameter of said section. The upright 5 is spaced back from the mold section and is connected thereto by rigid arms 7 disposed on opposite sides of the corresponding diametral line of the section.

The lower body section 2 is connected to the section 1 at the lowest point on the latter and between arms 7 for combined angular and parallel movement relative to section 1 by a hinge pin comprising upper and lower portions 8 and 9 pivoted together at adjacent ends, the upper portion being rigid with section 1 while the lower portion 9 is slidable in a boss 10 formed on section 2 with its axis parallel to that of said section.

Matching matrix sections 11 to engage a tire T, are mounted in the body sections, and are overlapped along their sides by skirts 12 projecting from and integral with the steam chambered portions of said sections, and ribbed as at R for strength.

The lower body section 2 is opened and closed relative to the upper section by the following means:

Extending between the lower section 2 at the front and the base 4 below is a toggle link unit 13, broken slightly toward the back from a dead center position when the mold is fully closed as shown in Fig. 3. The piston rod 14 of a hydraulic or air cylinder 15 is connected to the link unit, the cylinder being pivoted in connection with the base 4 adjacent the back of the mold.

Another toggle link unit 16 extends between the base 4 behind the cylinder just ahead of upright 5, and the boss 10 behind pin 9, the links of this unit being the same length as those of unit 13. This link unit is also broken slightly in a backward direction from a dead center position when the mold sections are fully closed, and can only break a limited amount in the same direction due to the obstruction offered by upright 5. A collapsible pull unit extends between the upper links of units 13 and 16, this pull unit comprising a rod 17 connected to link unit 16, a yoke 18 connected to unit 13 and through the base of which the rod slidably projects and a head or nut 19 on the rod to engage the yoke and limit relative axial or extending movement of the rod and yoke without preventing contracting movement thereof.

The pull unit is arranged relative to the toggle units so that when the latter are adjacent said dead center positions, or in other corresponding parallel relationship, the rod and yoke of the pull unit are fully extended relative to each other.

A locating or centralizing pin 20, parallel to the axis of the upper mold section 1, is slidably mounted in the latter at the front for axial movement; the lower mold section 2 having a shallow socket 21 to receive the lower end of the locating pin, which is pointed. By making the pin slidable it may project a sufficient distance below section 1 to engage the socket in the lower section while the latter is still some distance from a closed position and so insuring proper centralizing of the mold sections from then on. By making the socket shallow, the pin cannot enter far enough to bind with the subsequent angular opening movement of the sections; the pin of course sliding up as the mold sections move to a closed position.

In operation, and assuming at the start that the lower mold section is dropped to its limit for the insertion of a tire, it will be seen, as indicated by the dotted line position in Fig. 4, that the front link unit 13 is well broken or folded, the piston rod 14 is fully retracted in the cylinder, and the back link unit 16 is broken back to the limit allowed by upright 5, while the pull unit 17—18 is relatively contracted and the adjacent end of section 2 is lowered on pin 9. It will also be seen that the lower mold section is disposed with a downward slope to the front, facilitating the placing of a tire from the floor into said section.

When the pressure is applied to the cylinder 15 to advance rod 14, the front toggle link unit 13 becomes straightened, raising the front end of the lower mold section 2. The back link unit 16 remains in its broken position, since there is yet no force applied to straighten the same, and the weight of the mold tends to hold it broken. As a result, the mold section 2 closes with an angular motion, turning on the hinge pin as an axis.

As the section 2 approaches a closed position and the mold sections are parallel to each other, which is just before the tire actually enters the upper matrix member 3, the pull unit reaches a fully extended position as shown in Fig. 1.

A further straightening of link unit 13 therefore also straightens link unit 16, and since the links of the units are the same length, the section 2 will be moved up to a closed position while remaining parallel to the upper section. When the mold is thus fully closed, the sections are held closed independently of the power cylinder by any suitable means such as is commonly used for the purpose.

Upon opening the mold, the opening pull is only of course applied to the front toggle unit, pulling the mold section 2 at the front down from the upper section 2, and thus positively disengaging the adjacent portion of the tire from the matrix. Since there is nothing to definitely break the rear toggle link unit and the tire tends to remain firmly engaged with the adjacent portion of the matrix, the rear end of the lower section will be temporarily held from dropping and said section swings about the hinge pin as an axis, giving the desired initial angular opening of the mold. This holding of the back end of section 2 against dropping is aided by the fact that since the back link unit 16 is connected to boss 10 behind the hinge pin, the said link unit is pulled up to an even straighter or more nearly dead center position than before, thus offsetting any tendency for the back end of the mold section to drop. This will be apparent from a comparison of the link unit relative to its dead center line as indicated in Figs. 3 and 4. As soon as the lower section 2 has thus angularly dropped sufficient to disengage, the back end of the tire from the matrix, or at least seriously weaken the holding strength, the back end of the mold section slides down the pin member 9, causing the back toggle link unit to break to its limit of movement, and placing said unit in the position it assumes until the subsequent closing operation is carried out to again straighten the unit.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire mold including a pair of separate full-circle cooperating body sections together adapted to receive a tire, means mounting one section against movement, means hinging the sections together at one side for relative angular opening and closing movement, and including a member slidably projecting through the other section and parallel to the axis thereof, a toggle link unit connected to the other section and positioned opposite the hinge means and arranged when approaching a dead center position to dispose the side of the sections opposite the hinge means in closed relation to each other, means connected to said unit to collapse and extend the same instrumentalities connecting the unit and said other section at the hinged side thereof and including yieldable means disposed to cause limited separating movement of the sections at said hinged side with a relatively great separating movement of the sections at the opposite side, and means acting on said last named means to cause the other section, when the latter in response to an extending movement of the toggle unit has reached a position parallel to the one section, to then move to a fully closed position in response to a further extending movement of the unit while maintaining such parallel relationship with the one section.

2. A tire mold including a pair of separate full-circle cooperating body sections together adapted to receive a tire, means mounting one section against movement, means hinging the sections together at one side for relative angular opening and closing movement, and including a member slidably projecting through the other section and parallel to the axis thereof, a toggle link unit connected to the other section and positioned opposite the hinge means and arranged when approaching a dead center position to dispose the side of the sections opposite the hinge means in closed relation to each other, means applied to said unit to collapse and extend the same, another toggle link unit connected to said other section and arranged when approaching a dead center position to dispose the sections at the adjacent side in closed relationship and capable of limited collapse from such position and means connecting the link units and adapted when the other toggle unit is collapsed and after the arrival of the other section at a position parallel to the one section in response to the extending movement of the first named toggle unit, to extend the other toggle unit in response to a further extending of the first named unit and to the same extent.

3. A tire mold comprising a base, upper and lower full-circle cooperating body sections to receive a tire disposed above the base, means rigidly supporting the upper section from the base, means hinging the sections together at one side for opening and closing movement, a toggle link unit extending between the base and the lower section at the side thereof opposite the hinge means, said unit being extended when the sections are closed and means between the unit and base to control the movement of the toggle link unit, said hinge means including a member slidable in the lower body section and parallel to the axis thereof, another toggle link unit between the base and the lower section adjacent said member, said other link unit being extended when the sections are closed at the corresponding side and being arranged for limited collapsing movement with the lowering of the lower section on the member and means connecting the link units to extend the other link unit after the same is collapsed and with the further upward closing movement of the lower section at its opposite side obtained in response to the accompanying extending movement of the one link unit and after the lower section in its lowered position on the member has arrived at a position parallel to the upper body section.

4. A tire mold comprising a base, upper and lower full-circle cooperating body sections to receive a tire disposed above the base, means rigidly supporting the upper section from the base, means hinging the sections together at one side for opening and closing movement, a toggle link unit extending between the base and the lower section at the side thereof opposite the hinge means, said unit being extended when the sections are closed and means between the unit and base to control the movement of the toggle link unit, said hinge means including a member slidable in the lower body section in a plane parallel to the axis thereof, another toggle link unit between the base and the lower section adjacent said member, said other link unit being extended when the sections are closed at the corresponding side and being arranged for limited collapsing movement in the same direction as the first named unit and with the lowering of the lower section on the member, the links of the units being the same length, and a pull unit contractible from a predetermined length connecting corresponding links of the toggle units, said pull unit being fully extended when said links become parallel with each other.

5. A tire mold comprising a base, upper and lower full-circle cooperating body sections to receive a tire disposed above the base, means rigidly supporting the upper section from the base, means hinging the sections together at one side for opening and closing movement, a toggle link unit extending between the base and the lower section at the side thereof opposite the hinge means, said unit being extended when the sections are closed, means between the unit and base to control the movement of the toggle link unit, said hinge means including a member slidable in the lower body section and parallel to the axis thereof and down which said section may slide a predetermined distance and instrumentalities connecting the toggle unit and the lower section adjacent said member adapted to raise said member from a lowered position when the toggle unit is being extended and to raise the lower section at the opposite side when said section has assumed a position parallel to the upper section.

6. In a tire mold, mold body sections mounted together at one side for opening and closing movement, a locating pin mounted in one section at the opposite side for sliding movement in a plane parallel to the axis of said section, and projecting beyond the face of the section nearest the other section, and a relatively shallow socket in said other section to receive the adjacent end of the pin.

7. A tire mold comprising upper and lower mating mold sections, a base below the sections, means rigidly supporting the upper section from the base, a hinge connection between the sections on one side and including a depending member slidable in the lower section, a toggle link unit connecting the base and the lower section adjacent said member and disposed in an extended position when the sections are closed and adapted for limited collapsing movement in a direction away from the opposite side of the sections, another toggle link unit connecting the base and the lower section at the side opposite the hinge means, said other unit being disposed in an extended position when the sections are closed and adapted for collapsing movement in the same direction as the first named unit, means connected to said other unit to extend and collapse the same, and a pull unit connecting corresponding links of the toggle link units; said pull unit comprising a rod connected to a link of one toggle unit, a yoke connected to a link of the other toggle unit and in which the rod is slidable, and a yoke engaging stop on the rod to limit relative sliding of the rod and yoke in an extending direction, said pull unit being in a fully extended position when the mold sections are closed.

8. A tire mold comprising upper and lower mating mold sections, a base below the sections, means rigidly supporting the upper section from the base, a hinge connection between the sections on one side and including a depending member slidable in the lower section, a toggle link unit connecting the base and the lower section adjacent said member and disposed in an extended position when the sections are closed and adapted for limited collapsing movement in a direction away from the opposite side of the sections, another toggle link unit connecting the base and the lower section at the side opposite the hinge means, said other unit being disposed in an extended position when the sections are closed and adapted for collapsing movement in the same direction as the first named unit, means connected to said other unit to extend and collapse the same, and a collapsible pull unit connecting the toggle link units and fully extended when the link units are adjacent dead center positions and the mold sections are closed.

9. A mold as in claim 8, in which the first named toggle link unit is disposed to one side of a dead center position in the direction of collapse when the mold sections are closed and the pull unit is extended, whereby when the tension on the pull unit is relieved in response to a collapsing movement of the other toggle link unit, the first named toggle link unit will be moved toward a collapsed position by the weight of the lower mold section.

10. A tire mold comprising upper and lower mating mold sections, a base below the sections, means rigidly supporting the upper section from the base, a hinge connection between the sections on one side and including a depending member slidable in the lower section, a toggle link unit connecting the base and the lower section adjacent said member and disposed in an extended position when the sections are closed and adapted for limited collapsing movement in one direction, another toggle unit connecting the base and the lower section at the opposite side thereof, said other unit being extended when the mold sections are closed and adapted for collapse in one direction, means connected to said other link unit to collapse and extend the same, and a collapsible pull unit connecting the toggle link units to pull the first named link unit to an extended position after the same has been collapsed in response to an extended movement of the other link unit while allowing said other link unit to collapse to a greater extent than the first named link unit.

11. A tire mold comprising mating mold sections, a base, means rigidly supporting one section from the base, a hinge connection between the sections on one side and including a member slidable in the other section, a toggle link unit connecting the base and said other section adjacent said member and disposed in an extended position when the sections are closed and adapted for limited collapsing movement in one direction, another toggle link unit connecting the base and said other section at the opposite side thereof, said other link unit being extended when the sections are closed and adapted for collapse in one direction, means between the base and said other link unit to collapse and extend the same, and a collapsible pull unit connecting the toggle link units to pull the first named link unit to an extended position after the same has been collapsed in response to an extending movement of the other link unit while allowing said other link unit to collapse a greater extent than the first named link unit.

EDWIN A. GLYNN.